United States Patent [19]
Kaye

[11] 3,739,769
[45] June 19, 1973

[54] POWER HANDLE
[75] Inventor: Gordon E. Kaye, Garrison, N.Y.
[73] Assignee: P.R. Mallory & Co., Inc., Indianapolis, Ind.
[22] Filed: Oct. 23, 1970
[21] Appl. No.: 83,422

[52] U.S. Cl............ 128/6, 128/9, 136/90
[51] Int. Cl..... A61b 1/06, A61b 1/09, H01m 17/06
[58] Field of Search ............ 128/6, 9; 136/90

[56] References Cited
UNITED STATES PATENTS
| 3,613,682 | 10/1971 | Naylor | 128/303.1 |
| 2,482,971 | 9/1949 | Golson | 128/6 |
| 3,127,115 | 3/1964 | Yellott et al. | 128/6 UX |
| 3,173,811 | 3/1965 | Amiet | 136/90 |
| 3,516,869 | 6/1970 | Broglio | 136/90 X |

FOREIGN PATENTS OR APPLICATIONS
1,094,210 12/1954 France............... 136/90

Primary Examiner—Channing L. Pace
Attorney—Robert Levine

[57] ABSTRACT

A portable diagnostic medical tool with probe structure, to receive a detachable hollow handle containing a reserve type cell, normally inactive but manually convertible to active condition as an operating cell, with the hollow handle and cell made as an inexpensive discardable unit when the cell energy is used up.

12 Claims, 4 Drawing Figures

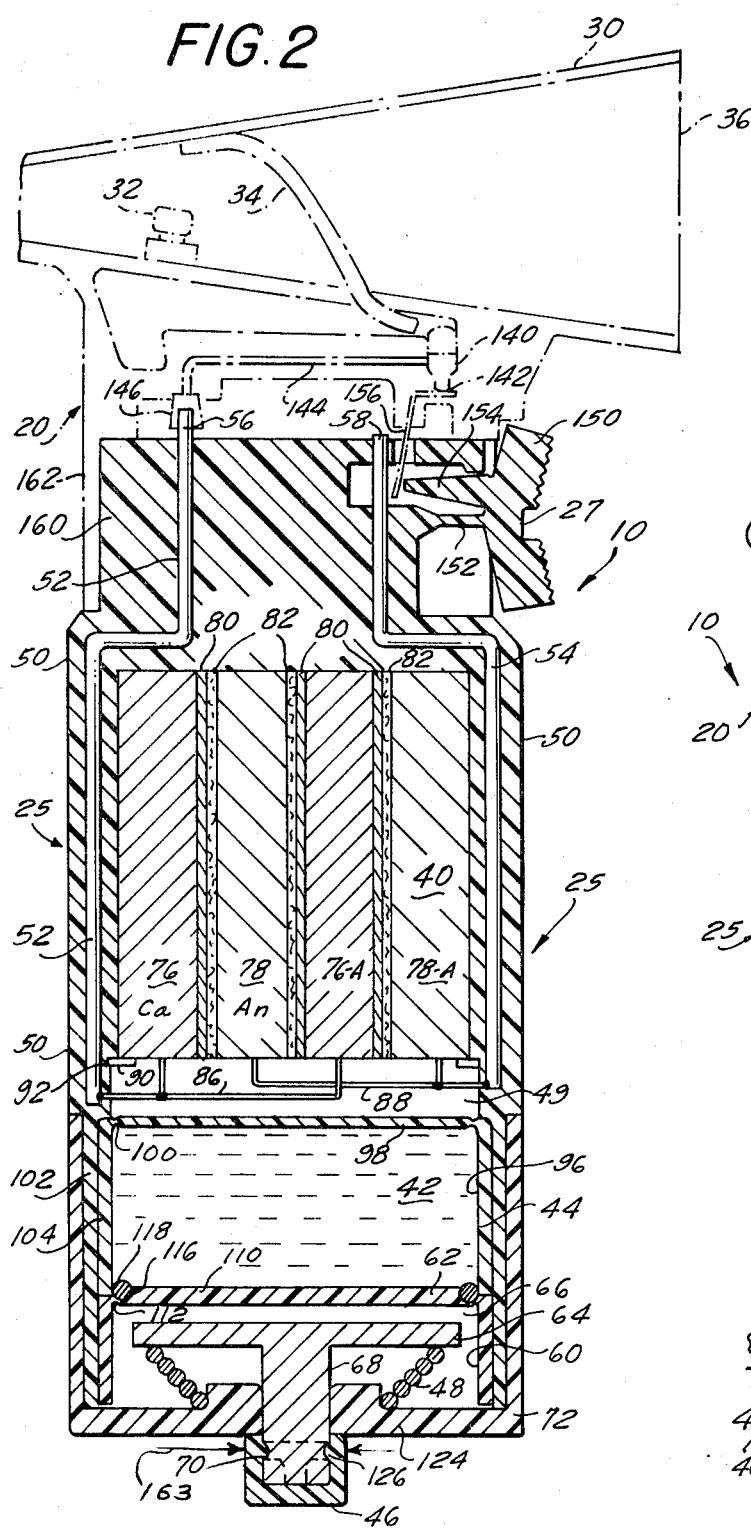

POWER HANDLE

This invention relates to a reserve cell power handle, as an attachable and detachable component containing a reserve cell, normally inactive but actuable to active condition when desired, and to be used readily as a power supply handle for a manually manipulatable device that requires electric energy for its energization and operation.

There are many devices, such as diagnostic lamps, for use by a physician, or by an ophthalmologist, which require electrical energy to light the lamp to permit inspection of analysis of a normally inaccessible part of the body. For such an inspection and analysis, it is desirable that a light beam and its light source may be manipulatable manually to direct a light beam to various areas to be observed and analyzed. In order to obviate the need for a cable connection to an external power supply source, it is desirable to utilize a local battery which can be readily carried by the operator of the inspecting device. By further extension, it is desirable that the power supply be included as an element of the handle, and within the handle, so that the device can be self-contained and readily manually operable and manipulatable to accomplish the purpose and function for which it is utilized.

As a further extension of the desire to have such a device complete and readily available, it is further desired that the handle and the battery supported therein may be interchangeable for immediate direct connection to, or separation from, the inspection or analytical device to which the battery is to be applied.

Further it is desirable that such operating handles with their enclosed battery supply source be made sufficiently economical to be discardable when the supply battery has given up all of its energy.

It is further desirable that in a handle of this type, the battery or electric cell which is employed and disposed in the handle, shall be kept in an inactive state until the handle is to be utilized and is connected to an operative device of the character referred to.

The objects of this invention are to provide an operating power handle which will have all of the foregoing desirable characteristics mentioned: (1) to be interchangeable; (2) to be economical enough to be expendable and discarded when the battery is exhausted; (3) to be readily attachable and detachable from an operating accessory to which the handle is to be mechanically connected and for which the battery is to serve as a supply source; (4) to provide a handle structure with the battery included therein, in such mutual arrangement, that the battery or cell will be normally inactivated, so that the power handle may be stored indefinitely until it is to be utilized, at which time, the cell in the handle can be activated to render the cell immediately available as a supply source.

In an embodiment of the present invention, the handle is constructed to serve as a housing for an inactivated electric cell and a sealed container of the electrolyte for the cell, but which is kept isolated from the cell structure until the cell is to be activated. At that time, the sealed container is broken by fracturing a normally closed or sealing portion of the container, to permit the electrolyte to be forced out of the container into an operating space representing the electrode region of the battery or cell, and the cell is thereupon rendered immediately capable of supplying energy as required and desired in the accessory element.

In this modification, the handle is constructed to mutually interfit with a housing element of the accessory, and, in the operation of fitting the handle to the accessory, electrical contacts are established between appropriate terminals on the handle and terminals in the accessory, including a switch mounted on and supported as part of the handle for controlling an electrical circuit established between a terminal on the handle and the terminal element on the accessory to which the handle is fitted.

The details of construction and the manner of operation of a reserve cell power handle and the construction of the elements for fitting the handle onto an external accessory, in accord with this invention, are more fully described in the following specification taken in connection with the accompanying drawings, in which FIG. 1 is a schematic perspective view of one type of operating device to which the power handle is shown applied;

FIG. 2 is a vertical sectional side view taken on line 2 — 2 of FIG. 1 and showing the interior of the handle and the reserve cell therein, and the slip-coupling to the accessory to which the handle is to be mutually coupled; and FIG. 3 is a side view of the release handle to release a spring-actuable striker plate to cause transfer of the electrolyte from its vial into the cell operating compartment; and FIG. 4 is a plan view taken along line 4—4 of FIG. 3 to show the shape of the guide rod and how it is held in detent by the release lever while the battery is not to be in use.

As generally shown in FIG. 1, a total operator device 10 is illustrated, comprising an electric accessory, such as a diagnostic probe 20, to which an operating power handle 25 of this invention is coupled, with a switch 27 shown on the handle 25 for electrically connecting internal circuitry between a battery in the power handle 25 and an energy-utilizing component in the diagnostic probe 20.

The complete device 10 of FIG. 1 is shown in detail in FIG. 2, where the diagnostic probe 20 is shown as provided with a viewing cylinder 30 containing a light source, such as a small lamp 32, appropriately shielded at its rear by a suitable shield 34 to prevent any light coming backward through the viewing cylinder 30 to the eye of an observer stationed at the back end 36 of the cylinder, at and from which visual inspection may be made of an area to be lighted at the front end of the viewing cylinder by the lamp 32. Connected to the housing 20 of the diagnostic probe is the housing of handle 25 which supports the switch 27 and is constructed in such manner as to be insertable into the housing 20 of the probe for direct physical and electric coupling.

In the view in FIG. 2, the power handle 25 serves as a housing or container for a multi-cell battery 40 and for a volume of electrolyte 42 disposed in a suitable container 44 directly beneath the space occupied by the battery cells 40. Normally, the electrolyte 42 is isolated from the battery space so that the battery is kept inactive until use of the battery is desired. At that time, after the handle 25 is coupled to the housing of the diagnostic probe 20, an activating mechanism, schematically indicated by a release lever element 46, is manually operated to release an initially compressed spring 48 to cause the electrolyte 42 to be transferred to the space 49 to activate the battery cells.

As shown in FIG. 2, the power handle 25 comprises a molded plastic housing 50, within whose walls are molded two electrical conductors 52 and 54 to provide the circuit connections from the battery electrodes to two upper contact terminals 56 and 58. The handle is provided with two internal chambers or spaces, one for the battery cell structure 40, and the other space to hold the electrolyte 42 in storage while the cell is not activated.

The housing 50 of the power handle is provided with an internal chamber 49 which extends to the rear or bottom of the handle, and is open for free insertion of the battery elements 40, and a vial or container 44 for electrolyte 42, and a spacer box 60 that has a bottom wall 62 to serve as a closure for the electrolyte container 44 until the electrolyte is to be transferred into the operating space 49 containing the electrodes of the battery 40, to establish the battery action. The space 66 in the spacer box 60 accommodates a rectangular striking plate 64 of rectangular shape to fit into the rectangular chamber 66 within the space box 60. The rectangular striking plate 64 is supported on a guide rod 68 provided with detent grooves 70 by means of which said external release lever 46 holds the guide rod 68 in detent position on the outside of a closure cap 72, while the guide rod 68 is so held, the striking plate 62 serves to compress said spring 48 until operation of the electric battery is desired. At that time, the release lever 46 is moved through a quarter turn to release the guide rod 68 at the detents 70, as shown in FIG. 3.

In assembling the battery multiple, sets of electrodes may be assembled, and for the purpose of the present description only two sets are illustrated. Such two cathode elements 76 and 76A, are disposed as shown, relative to two anodes 78 and 78A, appropriately separated by spacers, schematically indicated as combination sets including a depolarizer 80 and a porous spacer 82, that serve to rapidly absorb and retain the electrolyte when the electrolyte is introduced into the chamber 49 to serve as a conducting medium between the electrodes of the battery.

The two cathode electrodes 76 and 76A are electrically connected to a common conductor 86 which is appropriately connected to the imbedded conductor 52 during assembly of the battery elements in the housing during manufacture. Similarly the two anode electrodes 78 and 78A are connected to a common conductor 88 which is appropriately electrically connected to the conductor 54 imbedded in the wall of the housing 50. The two conductors 86 and 86A, and their connections to the electrodes and to the conductors imbedded in the housing 50, are covered with a suitable insulation that will withstand the electrolyte in order to prevent short-circuiting leakage between the electrodes of opposite polarity, in paths other than through the porous spacers and depolarizers 80 and 82.

The internal chamber 49 is illustrated schematically as dimensioned to receive the electrodes and their spacers in generally sliding fit relation so those electrodes will be held against vertical shifting within the handle. Other suitable means, such as a stop washer 90, may be utilized and fitted into a receiving groove 92 in the side wall 50 adjacent the lower end of the electrodes 76 and 78.

In order to keep the electrolyte isolated until its use is desired, the electrolyte is disposed in a box-like vial structure indicated by the box-like container 44, which is illustrated, by way of example, to have an internal chamber of generally rectangular section. The vial 44 for the electrolyte 42 embodies a hollow rectangular frame 96 as the defining wall structure of the container 44. The container 44 also embodies a floor or bottom wall 98, which is here shown on top of the structure 44 because of the inverted position of the electrolyte container 44.

The construction of the floor and bottom wall 98 of the container 44 embodies one of the features of this invention, which is that the floor 98 has a border periphery 100 which is notched or reduced in section so that the floor 98 will constitute a frangible element that may be popped out of its position in the box, upon application of pressure to the electrolyte 42 within the vial box 44. Such pressure on the electrolyte will hydraulically transfer the pressure to the frangible floor 98 and cause it to fracture and separate from the box 44 along the border 100 of reduced section. The electrolyte 42 is then free to flow into the space 49, and, in accordance with other features of the invention that will now be explained, the electrolyte will be forced into the chamber 49 and into the spacing materials including the porous spacers and the depolarizers between the electrodes.

By way of example, the body of the handle in the region 102 is shown provided with a slightly enlarged receiving dimension 104 to provide a receiving recess for the vial or container 44 for the electrolyte 42.

During manufacture and assembly of the handle and battery elements, the electrolyte 42 will be placed in the container 44 in upright position, and said container 44 which is open at its top to present a rectangular border structure along the lines 106 will be closed by said other superimposed spacer box 60 which serves several purposes.

First, the spacer box 60 embodies a floor wall 110 which is also notched around its border with a reduced section 112 to permit that floor 110 to be fractured and moved away from its related box structure 60, in order to serve as a piston in the container 44, to put hydraulic pressure on the electrolyte 42 to fracture the floor wall 98 in the electrolyte container 44, and to then force the electrolyte 42 into the electrode space 49 to render the battery active, due to the presence of the electrolyte between the electrodes.

In order that the fractured and separated floor wall 110 may serve as a relatively tight piston in the electrolyte container 44, said wall 110 is formed to embody a border annular seat 116 to support an O-ring 118, of resilient compressible plastic material, such as soft nylon, which is chemically inert to the usual caustic electrolytes utilized in batteries of this type.

When the floor 110 is fractured and separated from its box structure 60, the O-ring 118 serves to maintain a piston seal around the wall 110 as a piston 110, which is then forced into the electrolyte container 44.

The force for fracturing the floor wall 62, to convert it into a piston 110, is generated by a guided striking plate 64 when it is released by said release handle 46 to permit the compressed spring 48 to move the striking plate 64 to strike the floor wall 62 and fracture its connection to the box 60, thereby, converting the floor wall 62 into a piston for compressing the electrolyte.

As is clear from the view in Fig. 2, the box 60 serves as a support for the bottom floor wall 62 that is to be the piston, and that box 60 serves also as a spacer to provide space for the striking plate 64 and the compression spring 48.

After the box 60 is inserted into the handle with a sliding fit to seat on and close the box-shaped vial 44, serving as a container for the electrolyte, the striking plate 60 and the compression spring 48 are assembled on the outer cap 72 and locked in detent position by the release lever 46. The lower or inner end of the compression spring 48 is braced against a central boss 122 which serves also as a strengthening hub for the guide rod 68 which extends through the hub 122 to be engaged by, and to be held in detent position by, the release lever 46.

FIG. 3 shows the manner in which the release lever 46 serves in the normal position to embrace a circular peripheral detent groove on the guide rod 68, to hold the spring 48 compressed between the striking plate 64 and the back wall 124 of the closure cap 72. When an external compressive force member 163 (indicated by arrows) is rotated through a quarter turn, pressure on the detent elements 126 on the inside of the release lever 46 is removed. The guide rod is then released from its detention and the compressed spring 48 with its energy of compression is there permitted to push the striking plate 64 with substantial momentum to establish an accelerated striking force, to cause the fracture of the floor plate 62 from its box structure 60 and thereby convert the floor plate 62 into a piston with the sealing ring 118, to transmit that striking force hydraulically through the electrolyte 42 to cause a similar fracturing action on the floor wall 98 of the electrolyte container 44, to open the container around that floor wall 98 and to force the electrolyte upward into the chamber 49, to move into the spaces between the electrodes and to establish electrical cell and battery action.

Thus, it is seen that part 68 is held in position against the spring force of 48 by virtue of an external compressive force supplied by a member 163 shown by two arrows which forces the detents 126 into detent grooves on part 68. The compliant casing permits sufficient motion to take place to allow this detenting flexure, without rupturing the hermetic seal formed by bonding the compliant casing 46 and main casing 72 of the structure. A one piece structure could be used in some instances instead of bonding said casing 46 to the casing 72. By removing the applied force 163 supplied by the external structure the detents 126 are overcome by the spring and the rod 68 moves rapidly forward to activate the electrolyte holder seal 116.

To control the connection of the battery to the electrical device 32 in the probe 30, a socket type terminal 140 is shown on the probe, with a center contact 142 and a side conductor 144 ending in a socket 146, to receive the terminal end 56 of conductor 52 of immersed in the handle body 50.

The switch 27, on the handle body 50 embodies a plastic doubleheaded operating button 150, pivotally supported on a flexible plastic strip 152, shown integrally formed on the handle body 50. The operating button also embodies a pushing finger 154, which moves a resilient contact strip 156 into engagement with conductor 54, adjacent end 58, to close the battery circuit to the energy-utilization device 32, in one position of switch 27. In the other position of switch 27, the resilient strip 156 disengages conductor 54 to open the battery circuit to device 32.

In assembling the power handle 25 on the probe 20, the forward end of the handle housing 50 embodies a large boss 160 that fits snugly into a sleeve element 162 of the probe body 20, to couple the handle to the probe. During such coupling, the resilient contact strip 156 anchored at one end to the center terminal 142, projects into and through an opening 164 to be in position to be actuated by the switch 27.

By the construction shown, or similar modification thereof, a removable disposable handle with a reverse battery is provided for a diagnostic tool, or for any reverse cell power operable device until wanted for use. Modifications may be made in the structural arranement within the spirit and scope of the invention as defined in the claims.

What is claimed is:

1. A battery operated device comprising:
    1. a manually manipulatable diagnostic component said diagnostic component comprising:
        a. a hollow, conical viewing sleeve having a large opening at its proximal end and a relatively smaller opening at its distal end;
        b. electric lamp means supported by said viewing sleeve in proximity to the distal end thereof; and
        c. a shield disposed between said lamp means and said proximal opening of said viewing sleeve such that the light transmitted by said lamp means is directed through the distal end of said sleeve to thereby illuminate a desired portion of the body and is prevented from being transmitted to the proximal end of said sleeve through which visual inspection of the illuminated body area may be made;
    2. an hermetically sealed reserve cell handle, said handle being discardable, interchangable, and removably attachable to said sleeve of said diagnostic component, said handle consisting of a hollow body having a first chamber containing electrode components of a battery for providing the energy to operate said lamp means, and said handle having a second chamber containing an electrolyte isolated from said electrode components, wherein said second chamber is separated from said first chamber. by a first frangible floor wall, and wherein said second chamber defines a first cup-shaped box slidably fittable into said hollow handle adjacent to said electrode chamber and wherein a second box-like structure slidably fitting into said hollow handle embodies a floor wall to serve normally as a top closure for said electrolyte chamber, said floor wall being frangibly separable from said second structure to serve as a forcing piston against the electrolyte to hydraulically force said electrolyte against said frangible floor wall of said cup-shaped box containing said electrolyte; means within said second-box like structure to frangibly separate said floor wall from said second structure and to then force said separated floor wall as a piston against the electrolyte in said first structure to fracture the end wall of said first structure and force the electrolyte into the first or main chamber containing the electrodes;
    3. means on said handle for releasing said electrolyte from its isolating chamber, said means comprising an activation device which includes force-producing means for fracturing said frangible floor wall; and 4. restraining means on said handle for holding said electrolyte releasing means in detent position until released.

2. A battery operated device as in claim 1 wherein said activation device comprises
   a. a shaped striking plate supported on a guide rod, said guide rod provided with circular peripheral detent grooves;
   b. a compressible spring disposed between said striking plate and an external release member;
   c. a compliant cup-shaped external release member having detent means along its inner wall, said detent means comprising circular bosses shaped to fit within said detent grooves of said guide rod when said guide rod is in detent position;
   d. an external rotatable compressive force member disposed radially around the outer wall of said external release member whereby said compressive force member forces said detent means on said external release member into said detent grooves on said guide rod so that said external release member holds said guide rod and striking plate in detent position.

3. A battery operated device, as in claim 1 in which said sleeve of the diagnostic component and said body of said handle are formed to slidingly interfit, with an electrical terminal on said handle body; and with a switch supported on said handle body to establish an electrical circuit between a second electrical terminal on said diagnostic body structure and a second electrical terminal on said handle body.

4. A battery operated device, as in claim 1 in which said hollow handle has a multi-sided enclosure wall surrounding said first chamber, two spaced conductors are supported on said housing wall to extend from a back region of said chamber to a front region of said handle as a body for conducting current from the battery electrodes to said energy-utilization device.

5. A battery operated device, as in claim 4, in which the battery electrodes of opposite polarities are connected to said respective supported conductors by electrical elements having surface insulation to prevent short-circuiting action through said electrolyte when said electrolyte is introduced into said electrode chamber to be effective between said electrodes.

6. A battery operated device, as in claim 1, in which said means within the second box-like structure for fracturing said floor or front end wall, includes a piston plate to fracture and frangibly separate said floor wall from said second structure; guide means to support said piston plate to assure linear axial movement of said piston when released; and a compression spring for moving said piston when released.

7. A battery operated device, as in claim 6, in which an outer cap fits over the outer or lower and open end of said hollow handle housing; and said guide means for said piston plate is guidably supported on said cap; and restraining means normally holding said guide means to support the piston plate in restrained position, to hold said compression spring in compressed condition until restraining means is released to enable said compression spring to force said piston plate to function against the electrolyte.

8. A battery operated device, as in claim 7, in which said restraining means includes an element of said guide means that extends outward through an opening in an outer wall of said outer cap and that embodies a detent in a portion of said guide means that extends outward beyond said outer wall, and further includes a detent handle for normally engaging and holding said guide detent to keep the spring compressed, said handle being manually movable to release said guide detent to release said piston plate and compressed spring.

9. A battery operated device, as in claim 1, in which a piston ring of resilient compressible material surrounds and is supported by said separable floor wall to serve therewith as a piston ring on said floor wall as a piston against said electrolyte in said second chamber.

10. An activation device for use with a reserve cell having an electrolyte container therein comprising;
   a. a shaped striking plate supported on one end of a guide rod passing through an opening in a wall said guide rod provided with circular peripheral detent grooves located on the end of said rod opposite said shaped plate end;
   b. a compressible spring disposed between said striking plate and said wall;
   c. a compliant cup-shaped external release member having detent means along its inner wall, said detent means comprising hemispherical bosses fitting within said detent grooves of said guide rod to maintain said compressible spring compressed against said wall;
   d. said guide rod having axially entending grooves communicating with said peripheral detent grooves so that upon rotation of said external release member, said bosses may pass out of said detent grooves and release said compressed spring.

11. In a reserve cell power operable article comprising a power operable component having a body structure supporting an electrical energy utilization device, an hermetically sealed reserve cell handle therefor, said handle removably attached to said body structure and comprising:
   a. a hollow body having a first chamber containing electrode components of a battery;
   b. a second chamber containing an electrolyte isolated from said electrode components, said chamber defining a cup-shaped container having a frangible floor wall;
   c. means on said handle for releasing said electrolyte from its isolating container to enable said electrolyte to enter said electrode chamber to render said electrode components active as a battery, said means comprising an activation device which comprises:
      1. a shaped striking plate supported on one end of a guide rod passing through an opening in a wall, said guide rod provided with circular peripheral detent grooves located on the end of said rod opposite said shaped plate end;
      2. a compressible spring disposed between said striking plate and said wall;
      3. a compliant cup-shaped external release member having detent means along its inner wall, said detent means comprising circular hemispherical bosses fitting within said detent grooves on said guide rod to maintain said compression spring compressed against said wall;

4. said guide rod having axially extending grooves communicating with said peripheral detent grooves so that upon rotation of said external release member, said bosses may pass out of said detent grooves and release said compressed spring.

12. The device of claim 11 wherein said body structure of the power operable component and said body of said handle are formed to interfit; and further comprising an electrical terminal of said power operable body structure to be engaged by a mating electrical terminal on said handle body and a switch supported on said handle body to establish an electrical circuit between a second electrical terminal on said power operable body structure and a second electrical terminal on said handle body, wherein said switch comprises:

a. a double-headed operating button pivotally supported on a flexible strip integrally mounted on said handle body;

b. a pushing finger adjacent to and above said flexible strip, and below the uppermost end wall of said handle body, said pushing finger adapted for moving said second electrical terminal on said power operable body structure into engagement with said second electrical terminal on said handle body thereby closing the battery circuit to the energy-utilization device.

* * * * *